United States Patent
Poonsaengsathit et al.

[11] Patent Number: 5,974,357
[45] Date of Patent: Oct. 26, 1999

[54] SIGN TEXT DISPLAY FOR VEHICLE NAVIGATION SYSTEM

[75] Inventors: Roderick A. Poonsaengsathit, Huntington Beach, Calif.; Mikio Ohashi, Tokyo, Japan

[73] Assignees: Alpine Electronics; Honda Giken Kogyo Kabushiki Kaisha, both of Tokyo, Japan

[21] Appl. No.: 08/781,947

[22] Filed: Dec. 19, 1996

[51] Int. Cl.⁶ .................................................. G06F 165/00
[52] U.S. Cl. .......................... 701/210; 701/211; 701/201
[58] Field of Search .................................... 701/211, 201, 701/200, 206, 208, 209, 210; 340/996

[56] References Cited

U.S. PATENT DOCUMENTS

| | | | |
|---|---|---|---|
| 4,796,191 | 1/1989 | Honey et al. | 364/450 |
| 4,914,605 | 4/1990 | Loughmiller, Jr. et al. | 364/518 |
| 5,072,395 | 12/1991 | Bliss et al. | 364/443 |
| 5,107,433 | 4/1992 | Helldörfer et al. | 364/444 |
| 5,177,685 | 1/1993 | Davis et al. | 701/200 |
| 5,311,195 | 5/1994 | Mathis et al. | 342/357 |
| 5,337,113 | 8/1994 | Kagawa et al. | 354/298 |
| 5,515,283 | 5/1996 | Disai et al. | 701/200 |

*Primary Examiner*—William A. Cuchlinski, Jr.
*Assistant Examiner*—Arthur D. Donnelly
*Attorney, Agent, or Firm*—Skjerven, Morrill, MacPherson, Franklin & Friel LLP; Norman R. Klivans

[57] ABSTRACT

A vehicle navigation system for indication of the current vehicle position provides improved guidance to the driver when he is exiting from a freeway onto a freeway connector road segment (a freeway bifurcation), with the destination being a street (non-freeway road segment) linked to the freeway connector. In this case there is a possibility that the displayed sign text data at the first decision point upon exiting from the freeway does not correspond closely enough to the actual freeway signs, which tend to emphasize the connecting freeways rather than the street. This would tend to confuse the driver. Therefore, before the vehicle passes through the first decision point upon exiting the freeway, the sign text data for the freeway connector segment of the segment prior to the last freeway connector segment connecting to the destination street is displayed at the first guidance point, and not just the destination street. After the vehicle passes the first decision point on the freeway connector, if the sign text data for the last freeway connector segment on that set of freeway connectors is included in the sign text data for the freeway connector segment of one segment before the last road segment, the last sign text data is displayed; if not, the sign text data for the freeway connector segment of one segment before the last is displayed. Hence, the system reliably displays data indicating the freeway bifurcation onto which the driver wants to turn.

10 Claims, 5 Drawing Sheets

SIGN TEXT DISPLAY FOR VEHICLE NAVIGATION SYSTEM

BACKGROUND OF THE INVENTION

1. Field of the Invention

This invention relates to vehicle navigation and more particularly to display of data to a user indicating road sign information for route guidance. This disclosure relates to that of copending U.S. patent application Ser. No. 08/689, 944, filed Aug. 16, 1996, entitled "Sign Text Display Method and Apparatus for Vehicle Navigation System", incorporated herein by reference in its entirety.

2. Description of Related Art

Vehicle navigation systems are well known; see e.g. Yamada et al., U.S. Pat. No. 4,926,336; Link et al., U.S. Pat. No. 5,270,937; and Ichikawa, U.S. Pat. No. 5,410,485. Such navigation systems typically include two major functions. One function is route guidance which determines the optimum route to be followed from a starting point to a destination, typically along a network of roads. The other function is displaying to the user of the system (typically the driver of the vehicle) both the current location and the route to be followed. This display is usually in the form of a map displayed on a small display screen installed in the vehicle. Such systems are well known.

As is well known, typically in such systems a database is provided of the road network. This database lists all of the roads for instance in one state or in some other fairly large geographical area. This representation of the road network is sometimes referred to as a digitized map database. It includes for each road the road name, and divides each road into one or more road segments, where a road segment extends from one road node to another. A road node is typically either an intersection with another road or an intersection of a road with some arbitrary boundary, e.g. a state boundary and has an associated latitude and longitude.

In addition to providing the actual road information for use by the system, a typical digitized map database also includes road sign information. That is, when the database is compiled, i.e. by a survey of the roads, the surveyor also enters into the database the textual contents of at least some of the actual road signs encountered along each road segment. This road sign information is used in the prior art for route guidance, especially on roads such as freeways or equivalents (multi-lane limited access roads). When the system provides route guidance such as from a freeway exiting onto a surface street, road sign information from the database, referred to in the art as "sign text" is displayed on the display screen to the user. This sign text allows the driver to recognize the actual road sign information at a bifurcation in the road, i.e. a node, and more easily decide which road to follow. Thus this display of sign text enhances the route guidance function.

Hence the sign text data is usually an edited version of the actual text of the road sign and is often not the identical words nor arranged identically. Typically the sign text data is edited to make it meaningful for use in the database. This editing is a part of the compilation of the database. It is to be understood that typically the database is produced and sold separately (e.g as a CD ROM) from the actual navigation system since such a navigation system must be useful anywhere.

In some cases the route guidance instructions are provided not only by a visual display but also by announcement, i.e. by sound synthesis. The present invention is applicable both to systems using a display and systems having adequate sound synthesis capability. Hence the term "display" is used here to refer not only to a visual display, but also to an audible announcement by the system.

This invention relates to copending U.S. patent application Ser. No. 08/689,944, filed Aug. 16, 1996, inventor Roderick Poonsaengsathit and entitled "Sign Text Display Method and Apparatus for Vehicle Navigation System". That disclosure is similarly directed to guidance of a driver on road segments where the road segments connect to a freeway.

As shown in present FIG. 1, the driver intends to follow a guided route from a freeway A to a street A via freeway connector road segments 1, 2, 3. There are several decision points on these freeway connectors (freeway exit ramps), and route sign data for each decision point is associated with the corresponding freeway connector road segment. Assuming that the actual road sign at the first decision point DPT1 is Fwy B and Fwy C, the freeway connector road segment 1 between the first decision point DPT1 and the second decision point DPT2 has Fwy B/Fwy C as the associated sign text data. Usually, a sign text data includes branch segment data for the subsequent decision point. (Note that the display images shown associated with each guidance point in FIG. 1 are discussed later, and do not form a part of this explanation of the problem.)

FIG. 1 shows these actual route signs: Fwy B and Fwy C at decision point DPT1, Fwy B, Fwy C and A street at decision point DPT2, and Fwy B and A street at decision point DPT3. The following associated sign text data are stored in the road map data base: Fwy B/Fwy C for freeway connector road segment 1, Fwy B/A street for freeway connector road segment 2, A street for freeway connector road segment 3, and Fwy B for freeway connector road segment 4. (Note that the sign text data may not be identical to the actual road signs; this is conventional.)

In the conventional system, the sign text data Fwy B/Fwy C for freeway connector road segment 1 is displayed by the system at the first guidance point GPT1, which is located at a certain distance before DPT1; the sign text data Fwy B/A street for freeway connector road segment 2 is displayed at guidance point GPT2 after passing DPT1 and before DPT2; the sign text data A street for freeway connector road segment 3 is displayed at guidance point GPT3 after passing DPT2 and before reaching DPT3. The guidance points do not necessarily correspond to the location of the actual corresponding road signs, but instead are located at some distance before the associated decision point to allow the driver sufficient time to read the sign text data from the display and respond, in terms of turning in the correct direction at the subsequent decision point.

SUMMARY

In accordance with this invention, before the vehicle (following a guided route) passes the first decision point (on a bifurcating freeway), the sign text data for the freeway connector road segment of one road segment before the last freeway connector road segment connecting to a destination street on the guided route is displayed at the first guidance point. After the vehicle passes the first decision point, if the sign text data for the last freeway connector road segment is included in the sign text data for the freeway connector road segment of one road segment before the last freeway connector road segment, the sign text data of the last freeway connector road segment is displayed; if not, the sign text data for the freeway connector road segment of one segment before the last freeway connector road segment is displayed.

Therefore in accordance with this invention, instead of following the sign text display method disclosed in above-referenced Ser. No. 08/689,944, the sign text pertinent to the freeway bifurcation is displayed at the first guidance point. At successive guidance points, the method of Ser. No. 08/689,944 is used.

It is to be understood that the term "freeway" here means any multi-lane limited access highway so designated in the database, and so includes certain toll roads, etc. "Freeway connector" means, e.g. an entrance/exit ramp connecting two different "freeways" together, or any other road segment so designated in the database. "Freeway connector road segment" means a road segment in the database that is part of a "freeway connector". "First decision point" means a first decision point encountered on a guided route where a "freeway" bifurcates.

Thus the present invention is directed to the situation where a freeway exit connects to a plurality of freeway connector road segments, at least one of which is or connects to a street, i.e. a non-freeway segment. It is to be understood that the navigation system in accordance with the present invention readily distinguishes road segments which are a portion of a freeway or a freeway connector from other road segments, since freeway road segments in the database have an appropriate designation as being part of a freeway and/or as being a connector to a freeway.

Advantageously, a method and apparatus in accordance with this invention allow the driver to be more clearly alerted as to exactly where he should turn off the freeway and/or freeway connector(s) onto the destination street, thereby reducing driver confusion and improving utility of the system.

BRIEF DESCRIPTION OF THE DRAWINGS

FIGS. 5, 5A to 5F show further displays in accordance with this invention.

DETAILED DESCRIPTION

Figure 2:
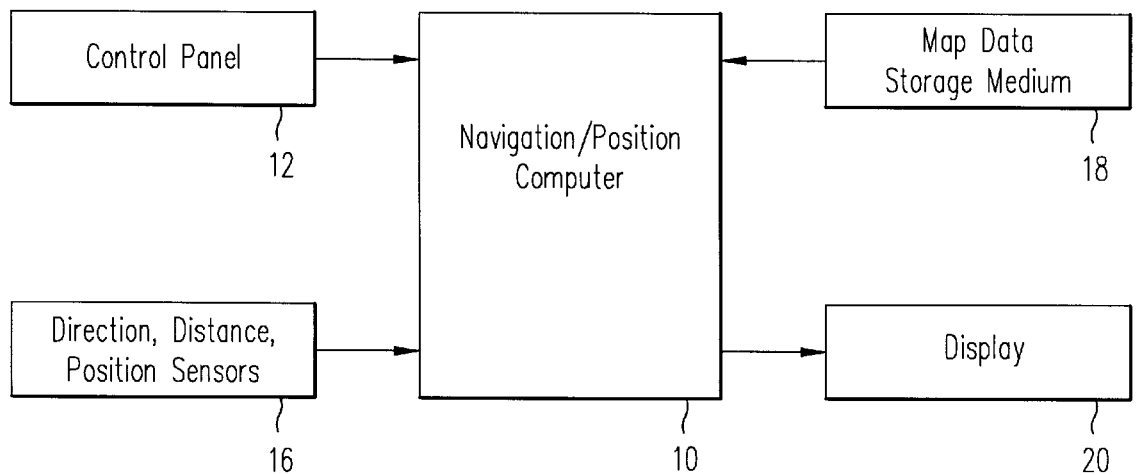
FIG. 2 shows of a block diagram a navigation system in accordance with this invention and of the type known in the prior art.

FIG. 2 shows a block diagram of a navigation system both of the type conventionally known in the art and for use in accordance with this invention and of the type shown in e.g. Link et al. U.S. Pat. No. 5,270,937. The most important element is a navigation/position computer 10 which is a conventional microprocessor or microcontroller with the usual associated circuitry and memory. A control panel (user interface) such as a keypad 12 is connected to navigation/positioning computer 10 and includes a plurality of for instance buttons and switches to input commands to navigation/position computer 10; control panel 12 may be a remote control or a hardwired control. Direction, distance and position sensors 16 provide input signals to navigation/position computer 10. The sensors output for instance the vehicle speedometer, a gyro scope, and/or a global positioning system (GPS) to indicate the present direction of travel and position of the vehicle. A map data storage medium 18 includes for instance a CD ROM and an associated CD ROM player. The CD ROM or hard drive holds the commercially available road map data which describes the road network for a particular geographical area. A variety of such map and data storage mediums are commercially available and are organized as described above. Display 20 is a visual and/audio display for providing information to the user, for instance directions as to the displayed route and an indication of the present vehicle position on a displayed map.

In general both the route finding and the associated map display method and apparatus in accordance with this invention are of the type used in the prior art and hence are not disclosed herein in any further detail, except as set forth hereinafter.

Figure 3:
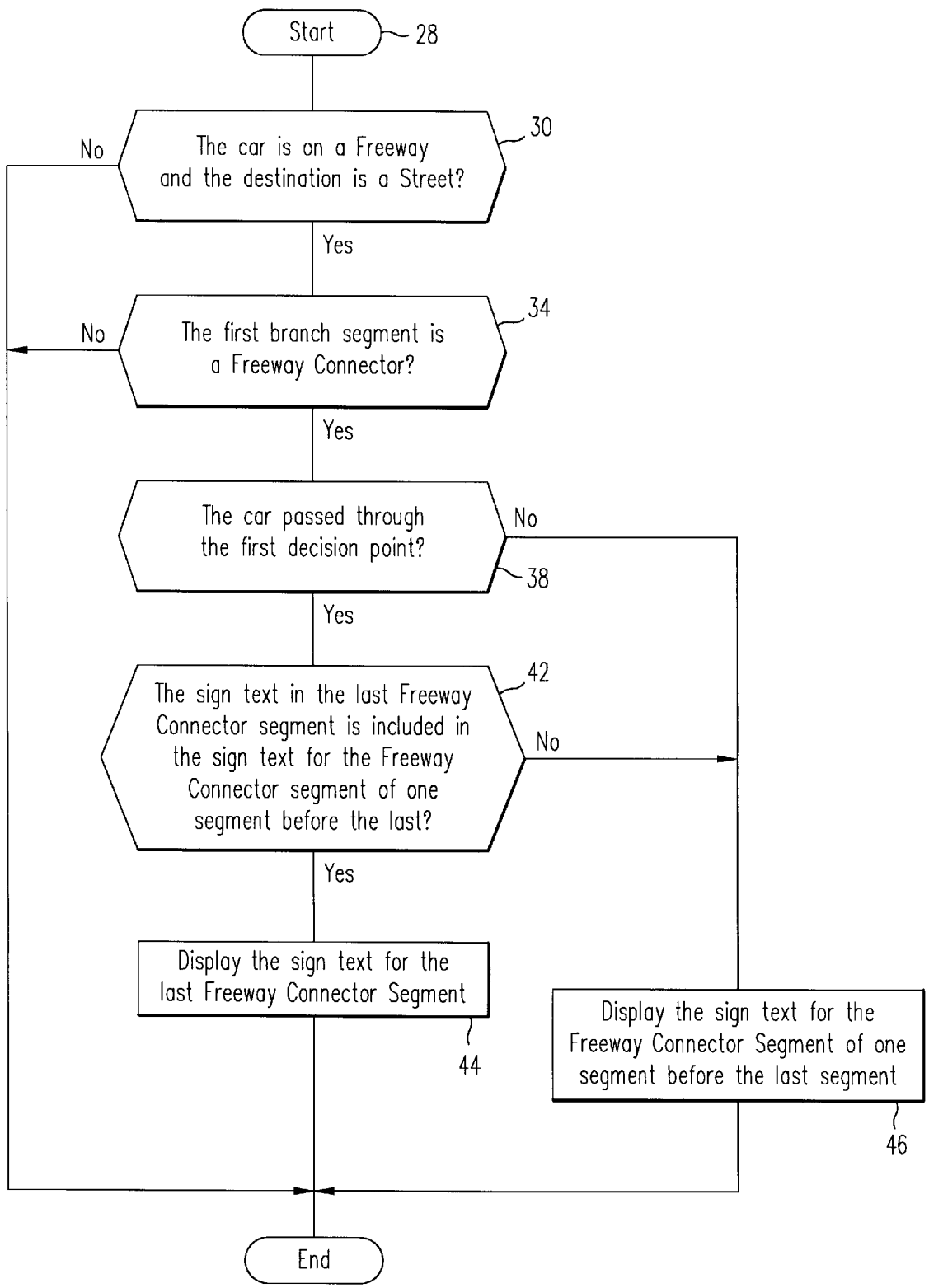
FIG. 3 shows a flowchart of sign text display in accordance with this invention.

FIG. 3 is a flowchart for a display of sign text according to the present invention. It is to be appreciated that the flowchart of FIG. 3 is only a small portion of a computer program (computer code) which is executed by computer 10 of FIG. 2 and stored in a computer readable memory associated with computer 10. Computer 10 provides a variety of functions, the most important of which are display of the current vehicle position and providing route guidance, i.e. determining a route between a start point and a destination and displaying instructions to the driver in order to adhere to the route. The present invention is directed to the position display function in general. However it is to be appreciated that this function is conventionally present in such a system and only the improvements in accordance with the present invention are described herein. Hence FIG. 3 only shows a small portion of the actual position display program.

The actual computer code (software) is not shown since such can easily be written in light of the present disclosure by one of ordinary skill in the art. The computer program can be written in a variety of computer languages. Thus FIG. 3 is a representation of steps in a computer program to be executed by computer 10 that is only a small portion of the total program carried out by computer 10. Moreover, the present invention is directed to both node based and road segment based map data storage databases. One of ordinary skill in the art may write the computer program for use with either of such types of databases.

Figure 1:
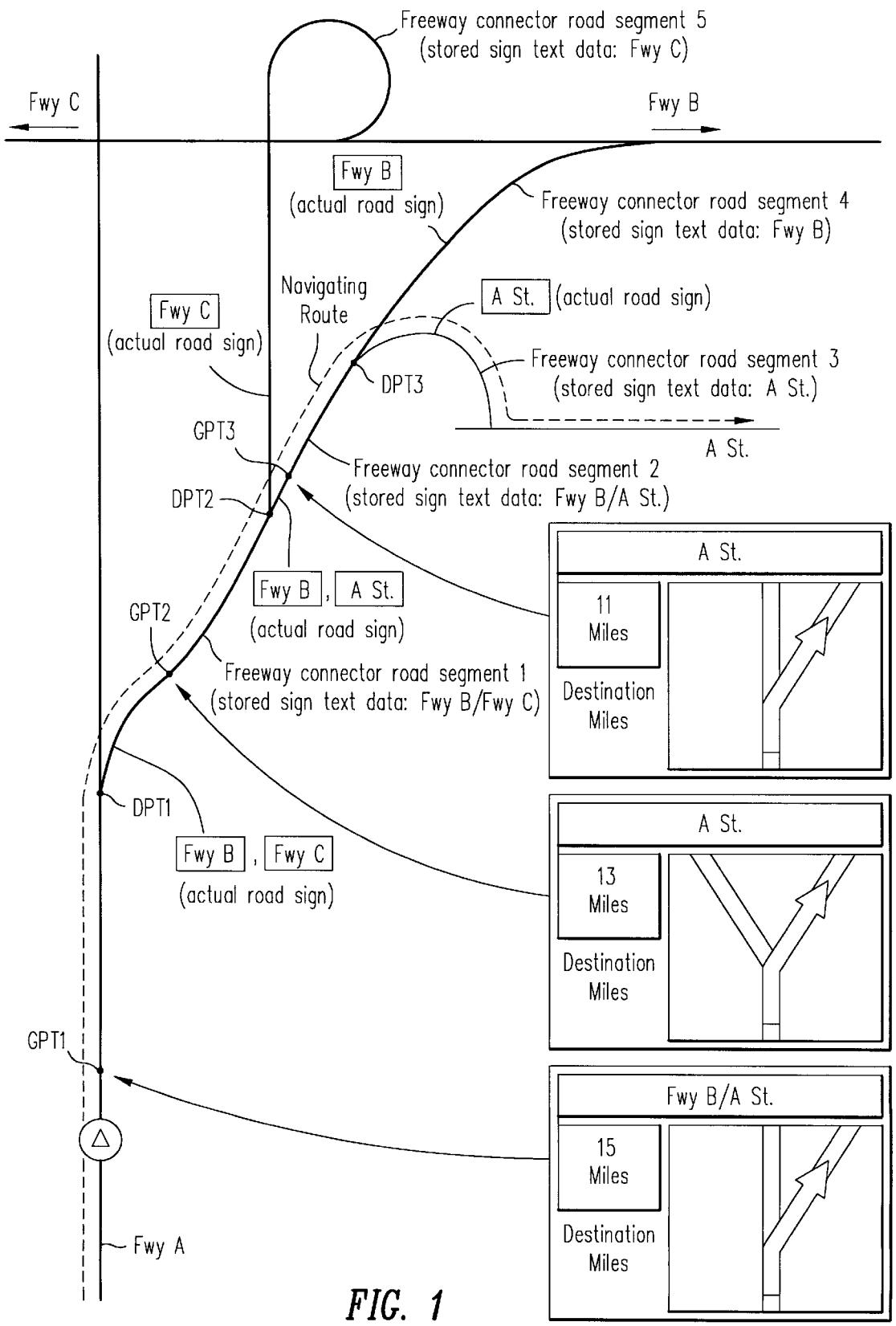
FIG. 1 shows graphically a portion of a road network and the associated decision points, guidance points, route signs and sign text data to which the present invention is directed.

As in FIG. 1, the guided route leading from freeway A to street A via the freeway connector road segments 1–3, the road signs, and the sign text data are the same as in a conventional system.

FIG. 3 begins with a start step 28. It is to be understood that the navigation system is in normal route guidance operation at step 28 and has already determined a guided route, and step 28 is invoked after a route has been calculated but before the vehicle begins driving on the guided route. The sign text displayed at each guidance point is processed or determined based on the route that has been calculated, assuming that the driver will follow the suggested route. Sign text determination is not done dynamically or "on the fly" as the vehicle passes each decision point.

The present navigation system first determines in step 30 whether the vehicle is on a freeway and the destination is a street (not a freeway or a freeway connector). If Yes (to both conditions), the system determines in step 34 whether the first branch road segment is a freeway connector. If Yes, the system determines in step 38 whether the vehicle has passed through the first decision point; if no (the vehicle has not so passed), in step 46 the system displays (at GPT1) the sign text data Fwy B/A street for the freeway connector road segment of one road segment before the last freeway connector road segment on the guided route.

Thereby, even if the route sign at DPT1 does not include A street, the driver is first told by the navigation system to take the correct branch at the freeway bifurcation. If the system were to display the sign text for A street at DPT1 instead of the sign text for Fwy B/A street, the driver would be looking for A street at the freeway bifurcation and could miss the turn, bypassing DPT1. In accordance with this invention, the sign text Fwy B/A street is displayed at DPT1, whereby the driver can avoid making the mistake of going straight and thereby mistakenly bypassing DPT1.

After passing through DPT1 (yes in step 38), the system determines in step 42 whether the sign text A street for the last freeway connector road segment on this part of the guided route is included in the sign text Fwy B/A street for the freeway connector road segment of one road segment before the last freeway connector road segment on this part of the guided route; if yes, the system displays the sign text A street for the last freeway connector road segment at GPT2 in step 44. If the answer in step 42 is no, control returns to step 46. This is because the driver is first guided to take the freeway connector at the bifurcation. After the vehicle has passed DPT1, the sign text for the last ramp road segment is displayed.

It is to be understood that the system, in steps 34 to 46, has already determined that as shown in FIG. 1 there are at least two consecutive freeway connector road segments along the guided route, and that the guided route is along these freeway connector road segments to a non-freeway (street) road segment, which (for purposes of the process of FIG. 3) is considered to be the destination.

Figure 4:
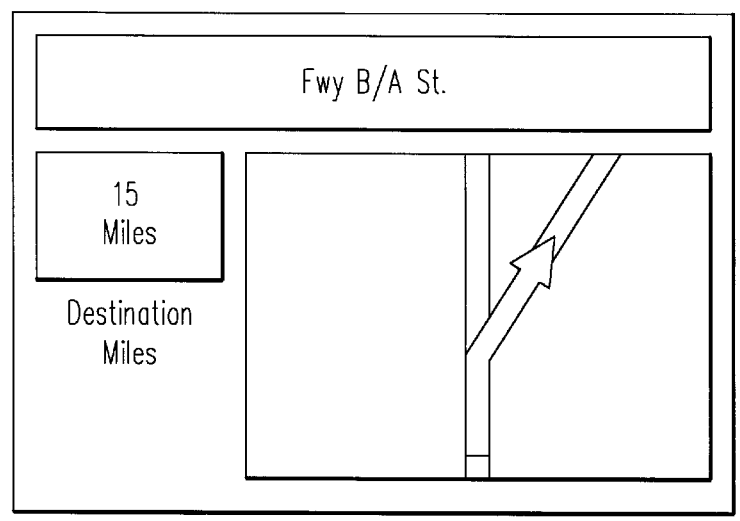
FIG. 4 shows an example of a visual display in accordance with this invention.

FIG. 4 is an example of a guidance display prior to the vehicle passing DPT1, on the upper part of which the sign text Fwy B/A street is displayed; this corresponds to step 46 in FIG. 3.

Next, another example of what is displayed in certain circumstances is described also following the steps of FIG. 3.

In FIG. 1, the guided route (dotted line) is from a freeway A to A street via the freeway connector road segments 1, 2, 3. The following (actual) road signs (shown in boxes) are present: Fwy C, Fwy B, and A street at DPT1, Fwy C, Fwy B and A street at DPT2, and Fwy B and A street at DPT3. Further, the following sign text data (shown as a display image in FIG. 1) in accordance with the invention are displayed by the navigation system Fwy B/A street for freeway connector road segment 1, A street for freeway connector road segment 2, and A street for freeway connector road segment 3. The signtext in the database is the same as the signtext in FIG. 1, with the exception of the signtext associated with segment 1, which for FIG. 1 has the sign "A St."

The present navigation system first determines whether the vehicle (following the guided route) is on a freeway and if the destination is a street (step 30 in FIG. 3). If Yes, the system determines (step 34) whether the first branch road segment on the guided route is a freeway connector road segment. If Yes, the system determines (step 38) whether the vehicle has passed the first decision point DPT1; if not, the sign text data Fwy B/A street is displayed at guidance point GPT1 (step 46). The driver therefore will know that he should follow the direction to Freeway B on the display to stay on the guided route. Thereby, the driver can avoid going straight on Freeway A at DPT1, and mistakenly bypassing his exit.

Next, after passing through DPT1, the system reverts to the method of Ser. No. 08/689,944 and determines (step 42) whether the sign text A street is included in the sign text for the freeway connector road segment 2 which is one freeway connector road segment before the last freeway connector road segment 3. Hence the sign text A street is displayed at GPT2, after the vehicle passes through DPT1 (return to step 46). The driver will thereby know he should follow the direction A street at DPT2 and DPT3. During driving, the navigation system reads all sign text data in the database along the freeway connector road segments from the first decision point DPT1 to the destination A street in advance, before the vehicle reaches the guidance point GPT1: therefore the system knows how the freeway connector road segments are connected to one another.

In one embodiment, the present navigation apparatus displays guidance pictures such as shown in FIGS. 5A to 5F without displaying a map picture showing a map and a vehicle position mark during vehicle traveling, and to guide the driver by using speech information for designating the direction in which the driver is to drive. In each of the guidance pictures in FIGS. 5A to 5F, the distance (miles) to an intersection is indicated in a space CDS; the distance (miles) to a destination is indicated in a space DDS; a sign VCD indicates performing speech guidance; the present time is displayed in a space TDL; and the vehicle heading direction is indicated in a guidance image NVG.

Figure 5A:
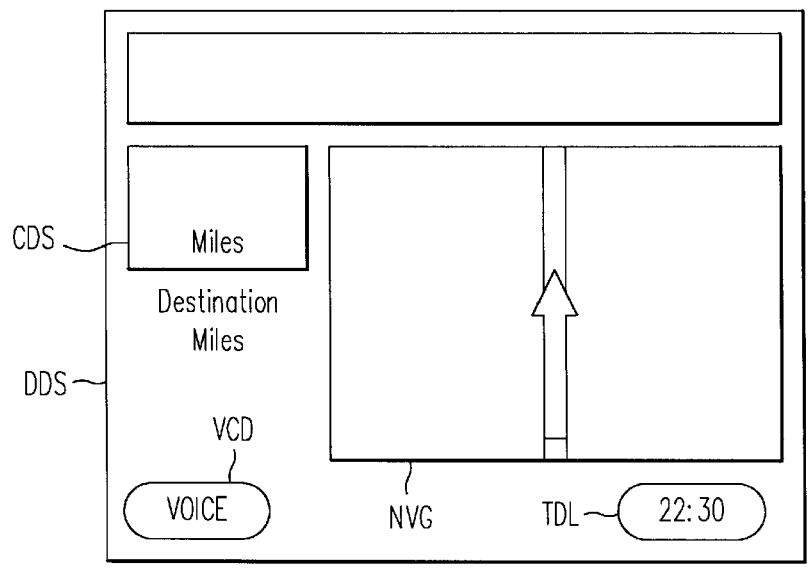
Figure 5B:
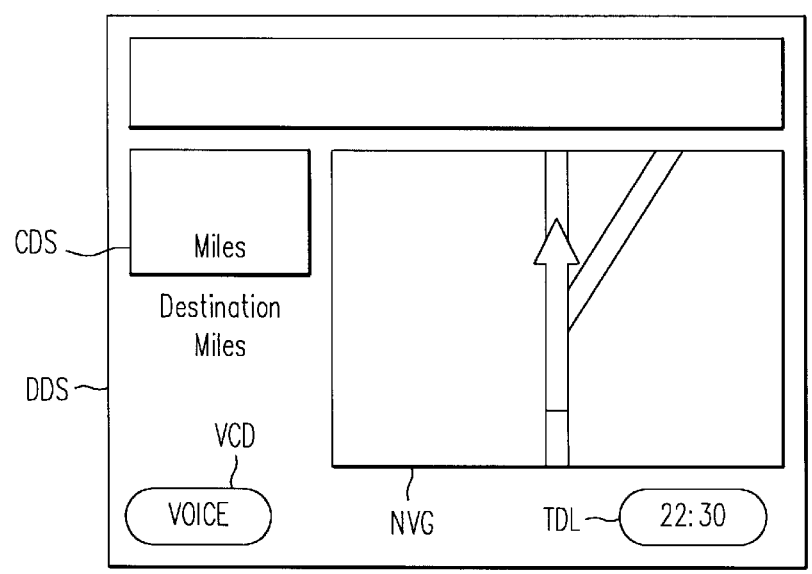
Figure 5C:
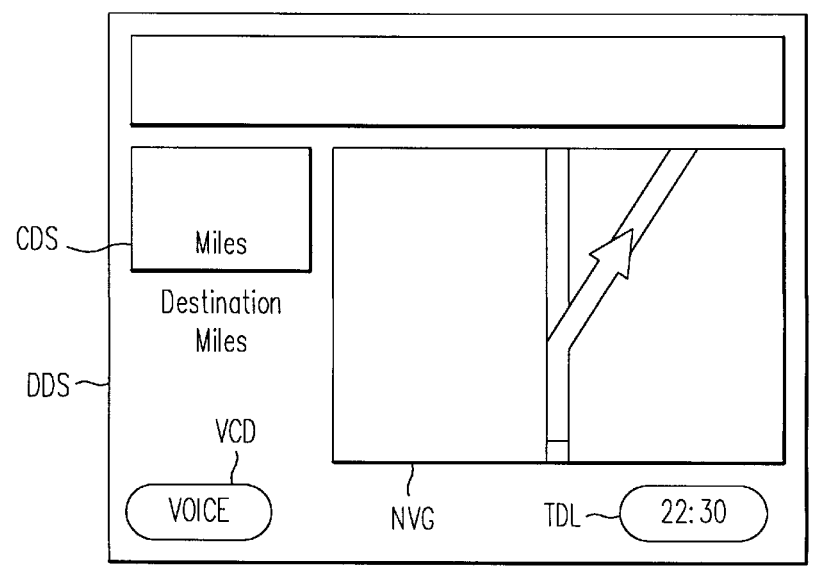
Figure 5D:
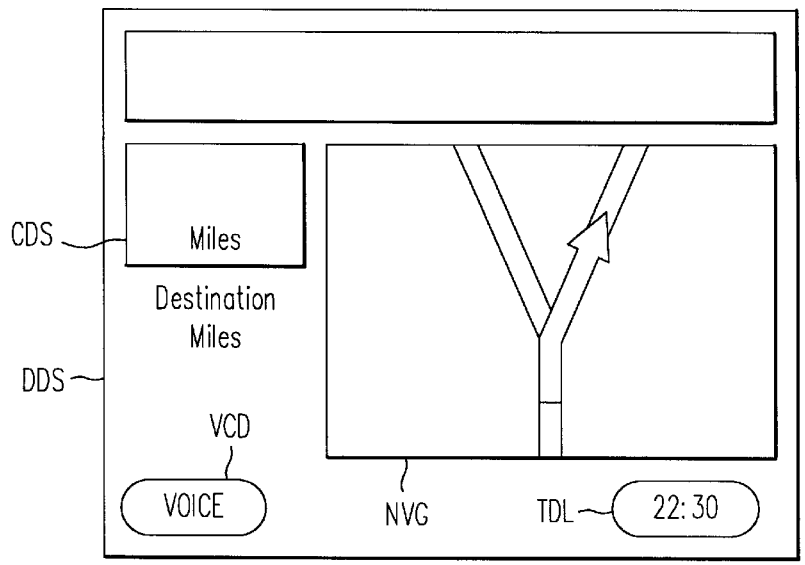
Figure 5E:
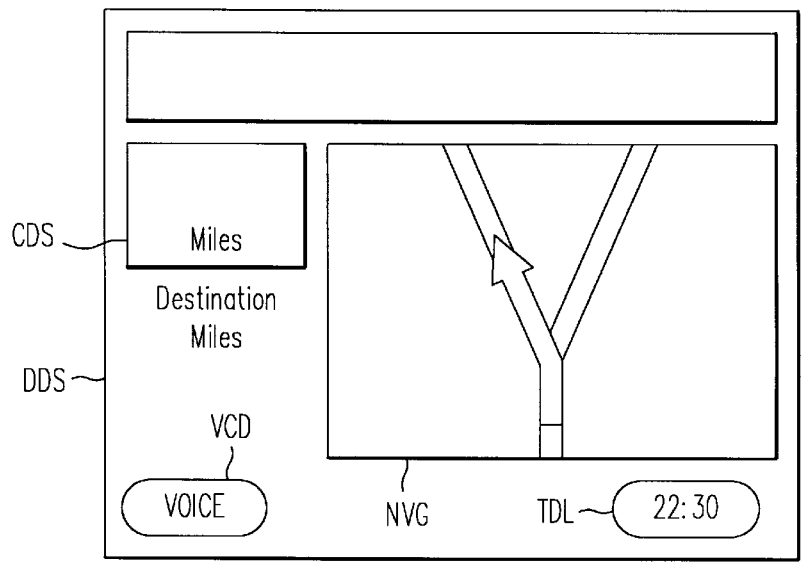
Figure 5F:
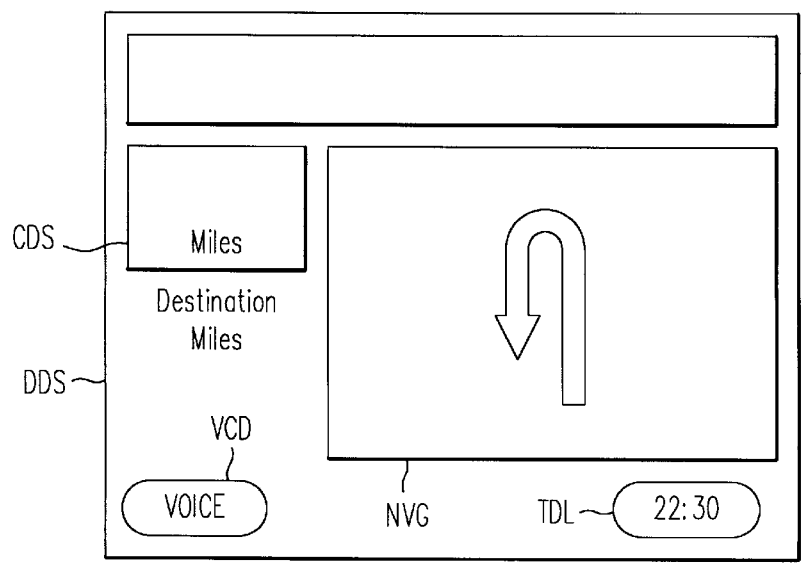

If there is no intersection or a branching point in a guided route within a predetermined distance of the present vehicle position, a guidance picture such as FIG. 5A designating straight passage is displayed. If there is an intersection being approached within the predetermined distance, a guidance picture such as one of FIGS. 5B to 5E is displayed which contains an enlarged diagram of the intersection or branching point and an arrow indicating a heading direction. If a U-turn is required, a U-turn figure such as shown in FIG. 5F is displayed. When a point at a predetermined distance from the branching point or intersection is reached, speech guidance is provided to designate the heading direction.

This disclosure is illustrative and not limiting: further modifications will be apparent to one skilled in the art in light of this disclosure, and are intended to fall within the scope of the appended claims.

We claim:

1. A method of displaying a guided route in a vehicle navigation system, the guide route being a linked series of road segments, the guided route including a destination street that is not a freeway and at least first and last road segments that are freeway connector road segments, there being stored sign text associated with the road segment, the method comprising the steps of:

(a) determining if the vehicle has passed a first decision point that is a bifurcation of a freeway on the guided route;

if it is determined that the vehicle has passed the first decision point, then:

(b) determining if a last freeway connector road segment on the guided route is designated in a sign text associated with a freeway connector road segment immediately prior to a last freeway connector road segment on the guided route;

(c) if step (b) is determined to be true, then displaying the sign text associated with a last freeway connector road segment on the guided route; and (d) if step (b) is determined to be false, then displaying a sign text data associated with the freeway connector road segment immediately prior to the last freeway connector segment on the guided route.

2. The method of claim 1 wherein the sign text differs from an actual road sign associated with each of the road segments.

3. The method of claim 1, wherein a freeway connector road segment is any road segment so designated in a database of the road segments.

4. The method of claim 1, wherein the steps of displaying each include displaying visually.

5. The method of claim 1, wherein the steps of displaying each include announcing audibly.

6. A navigation system for displaying a guided route on a road network that is a series of linked road segments, the guided route including a destination street that is not a freeway and at least first and last road segments that are freeway connector road segments, the system comprising:

means for determining a current location of the vehicle;

means for determining if the current location of the vehicle is past a first decision point on a freeway on the guided route;

means for determining, if the vehicle has passed the first decision point, if a last freeway connector road segment on the guided route is designated in a sign text associated with a freeway connector road segment immediately prior to a last freeway connector road segment on the guided route;

means for displaying, if the vehicle is determined to be past the first decision point, the sign text associated with a last freeway connector road segment on the guided route; and means for displaying, if the vehicle is determined not to be past the first decision point, a sign text associated with the freeway connector road segment immediately prior to a last freeway connector segment on the guided route.

7. The system of claim 6, wherein the sign text differs from an actual road sign associated with each of the road segments.

8. The system of claim 6, wherein a freeway connector road segment is any road segment so designated in a database of the road segments.

9. The system of claim 6, wherein the means for displaying include means for displaying visually.

10. The system of claim 6, wherein the means for displaying include means for announcing audibly.

\* \* \* \* \*